US012577164B2

(12) United States Patent
Autef

(10) Patent No.: US 12,577,164 B2
(45) Date of Patent: ***Mar. 17, 2026

(54) DRY PARTICULATE COMPOSITIONS FOR THE FORMATION OF GEOPOLYMERS, A PROCESS FOR FORMING GEOPOLYMERS AND THE GEOPOLYMERS OBTAINED AS A RESULT

(71) Applicant: IMERTECH SAS, Paris (FR)

(72) Inventor: Alexandre Autef, Saint Victurnien (FR)

(73) Assignee: IMERTECH SAS, Paris (FR)

( * ) Notice: Subject to any disclaimer, the term of this patent is extended or adjusted under 35 U.S.C. 154(b) by 417 days.

This patent is subject to a terminal disclaimer.

(21) Appl. No.: 16/323,348

(22) PCT Filed: Jul. 17, 2017

(86) PCT No.: PCT/EP2017/068018
§ 371 (c)(1),
(2) Date: Feb. 5, 2019

(87) PCT Pub. No.: WO2018/024474
PCT Pub. Date: Feb. 8, 2018

(65) Prior Publication Data
US 2021/0284577 A1      Sep. 16, 2021

(30) Foreign Application Priority Data

Aug. 5, 2016    (FR) ...................................... 16/01209
Aug. 25, 2016    (EP) ...................................... 16306086

(51) Int. Cl.
*C04B 28/26*      (2006.01)
*C04B 22/06*      (2006.01)
*C04B 24/26*      (2006.01)
*C04B 40/00*      (2006.01)

(52) U.S. Cl.
CPC ............ *C04B 28/26* (2013.01); *C04B 22/062* (2013.01); *C04B 24/2611* (2013.01); *C04B 40/0042* (2013.01)

(58) Field of Classification Search
CPC ... C04B 28/26; C04B 22/062; C04B 24/2611; C04B 40/0042
See application file for complete search history.

(56) References Cited

U.S. PATENT DOCUMENTS

| | | | | |
|---|---|---|---|---|
| 10,472,282 B2 * | 11/2019 | Autef | .................. | C04B 40/0042 |
| 2010/0222204 A1 * | 9/2010 | Frizon | .................... | C01B 33/20 |
| | | | | 502/60 |
| 2011/0071687 A1 | 3/2011 | Uraki et al. | | |
| 2012/0024196 A1 * | 2/2012 | Gong | ................... | C04B 12/005 |
| | | | | 404/72 |
| 2012/0094028 A1 * | 4/2012 | Briand | ................... | C08L 63/00 |
| | | | | 523/466 |
| 2012/0152153 A1 | 6/2012 | Gong et al. | | |
| 2014/0264140 A1 * | 9/2014 | Gong | ................... | C04B 28/006 |
| | | | | 106/676 |
| 2016/0061806 A1 * | 3/2016 | Reid | .................... | C04B 12/005 |
| | | | | 250/395 |

FOREIGN PATENT DOCUMENTS

| | | | | |
|---|---|---|---|---|
| CN | 105541203 A | 4/2016 | | |
| EP | 2837608 A1 | 7/2014 | | |
| EP | 2 853 550 A1 | 4/2015 | | |
| WO | WO-2008113609 A2 * | 9/2008 | .......... | C04B 12/005 |
| WO | WO 2011/071687 A1 | 6/2011 | | |

OTHER PUBLICATIONS

English machine translation of CN 105541203A. May 4, 2016. (Year: 2016).*
International Search Report and Written Opinion issued Oct. 9, 2017, in International Application No. PCT/EP2017/068018 (16 pgs.).
Nematollahi Behzad et al., "Effect of different superplasticizers and activator combinations on workability and strength of fly ash based geopolymer," Materials and Design, London, GB, vol. 57, Jan. 31, 2014, pp. 667-672.
Zhang S. et al., "Novel modification method for inorganic geopolymer by using water soluble organic polymers," Materials Letters, North Holland Publishing Company, Amsterdam, NL, vol. 58, No. 7-8, Mar. 1, 2004, pp. 1292-1296.
Database WPI, Week 201661, Thomson Scientific, London, GB; AN 2016-28917F, May 4, 2016.

* cited by examiner

*Primary Examiner* — John E Uselding

(74) *Attorney, Agent, or Firm* — Finnegan, Henderson, Farabow, Garrett & Dunner, LLP

(57) ABSTRACT

The invention concerns dry particulate compositions for forming a geopolymer, comprising an aluminosilicate containing mineral, a polymeric additive, an alkali metal silicate, and an alkali metal hydroxide. The invention concerns processes of making geopolymers, the geopolymers, as well as the use of the dry particulate compositions in the formation of geopolymers.

20 Claims, No Drawings

DRY PARTICULATE COMPOSITIONS FOR THE FORMATION OF GEOPOLYMERS, A PROCESS FOR FORMING GEOPOLYMERS AND THE GEOPOLYMERS OBTAINED AS A RESULT

CLAIM FOR PRIORITY

This application is a U.S. national phase entry under 35 U.S.C. § 371 from PCT International Application No. PCT/EP2017/068018, filed Jul. 17, 2017, which claims the benefit of priority of FR Application No. 16/01209, filed Aug. 5, 2016 and EP Application Serial No. 16306086.6, filed Aug. 25, 2016, from which this application claims priority and all of which are incorporated herein by reference.

SCOPE OF THE INVENTION

The present invention relates in general to geopolymers and in particular to dry particulate compositions to form aluminosilicate geopolymers. The present invention also concerns the process for the preparation of these geopolymers by adding water and the geopolymers obtained in this way.

BACKGROUND TO THE INVENTION

The geopolymers are a part of the family of aluminosilicates designated by the term polysialates, which is an abbreviation of poly (silicon-oxo-aluminate). These materials may be compared with inorganic polymers and result from a synthesis in the presence of an alkaline solution alkaline and aluminium and silicon oxides at a temperature below 100° C. The exact mechanism of the geo-polymerisation remains undetermined in particular because of its rapid reaction. Nevertheless, the scientific community is in agreement that it involves a mechanism for the dissolution of the initial components used followed by polycondensation in the form of a gel.

According to Fernandez-Jiménez A. et al. (Cement and Concrete Research, 35 (6), pages 1204 to 1209, 2005), the dissolving of a solid aluminosilicate by alkaline hydrolysis is the first stage in the reaction and leads to the formation of aluminates and silicates. When stable, a saturated solution is formed which leads to a network of oligomers resulting from polycondensation. This process requires a substantial quantity of water which must then be eliminated from the product.

In some instances, geopolymers precursors have been prepared as dry pre-mixtures that can be easily stored, handled and transported, and that may then be used on site to prepare the geopolymer. In this case, a geopolymer may be obtained by the preparation of a reactive mixture, by adding water to a dry composition.

These dry mixtures can comprise a metallic silicate powder that is soluble in water and an aluminosilicate powder. The precursors to geopolymers may also include supplementary ingredients. These supplementary ingredients are described in potential lists of several components.

One purpose of the present invention is to offer a dry mixture needing little water in order to form geopolymers possessing the mechanical properties desired.

The present invention also involves a process for the preparation of a geopolymer on site by adding water to the dry particulate mixture.

DESCRIPTION OF THE INVENTION

The purpose of the present invention is the dry particulate composition to form a geopolymer comprising:

a mineral containing an aluminosilicate,
a polymeric additive,
an alkali metal silicate, and
an alkali metal hydroxide.

The first method of realising the present invention therefore involves a dry particulate composition to form a geopolymer. This dry particulate composition may be called a dry mixture or pre-mixture to form a geopolymer.

Such particulate compositions are called dry. As used here, "dry" must be understood as having a level of moisture content of less than 10% by weight, for example less than 5% by weight, less than 2% by weight, less than 1% by weight, or less than 0.5% by weight, which for the dry particulate composition is determined by a loss of weight after drying at 110° C.

According to different methods of realisation of the invention that may be combined:

the rate of the amorphous phase of the mineral mixture containing an aluminosilicate-polymeric additive is at least 30% by weight;

the result of multiplying the specific surface area in $m^2/g$ by the rate of the amorphous phase of the said mixture of mineral containing an aluminosilicate-polymeric additive falls in the range 1 to 18;

the dry particulate compositions are from 25% by weight to 79% by weight of mineral containing an aluminosilicate, from 5% to 30% by weight of polymeric additive, from 15% by weight to 50% by weight of alkali metal silicate and from 1% by weight to 25% by weight of alkali metal hydroxide, with the percentages being expressed in proportion to the total weight of the dry particulate compositions;

the said mineral comprising an aluminosilicate is chosen from the group consisting of metakaolin, fly ash, halloysite, metahalloysite, slag, pulverised rock, fine sand, fireclay, kaolin, mica, fine feldspar, and their mixtures;

the polymeric additive is chosen from the group consisting of polyethylenes (PE), polypropylenes (PP), thermoplastic urethanes (TPU), styrene-butadiene styrenes (SBS), styrene ethylene butadiene styrenes (SEBS), polyesters, polyethylene terephthalates (PET), high-density polyethylenes (HDPE), low-density polyethylenes (LDPE), polyvinyl chlorides (PVC), polyvinylidene chlorides (PVDC), polystyrenes, polyamides, acrylonitrile butadiene styrenes (ABS), maleimide/bis-maleimides, melamine formaldehydes, phenol formaldehydes, polyepoxides, polyetheretherketones (PEEK), polyetherimides, polyimides, polylactic acids (PLA), polymethyl methacrylates (PMMA), polytetrafluoroethylenes (PTFE), urea-formaldehydes, furans, silicones, polysulfones, and mixtures thereof;

the alkali metal of the alkali metal silicate is chosen from the group consisting of Na, K, Li, Rb, Cs and their mixtures;

the alkali metal hydroxide is chosen from the group consisting of NaOH, KOH, LiOH, RbOH, CsOH and their mixtures;

the amorphous phase content of the mineral mixture containing an aluminosilicate-polymeric additive is at least 50% by weight and the result of multiplying the specific surface area $m^2/g$ by the amorphous phase content of the said mixture falls in the range 5 to 15;

the rate of the amorphous phase of the mineral mixture containing an aluminosilicate-polymeric additive is at least 70% by weight and the result of multiplying the specific surface area in $m^2/g$ by the amorphous phase content of the said mixture falls in the range 10 to 15;

the result of multiplying the specific surface area in $m^2/g$ by the amorphous phase content of the said mixture falls in the range 7 to 15 or 7 to 14;

in addition, the dry particulate compositions include a supplementary constituent chosen from the group consisting of mica, fireclay, quartz, quartz sand, silica fume, talc, andalusite, wollastonite, recycled glass, fibres, carbon nanotubes, metallic elements and their mixtures.

The invention is also aimed at a geopolymer obtained from a dry particulate composition according to the invention and/or by a process according to the invention.

Regarding the present invention, the term "geopolymer" may be defined as an inorganic polymer of an aluminosilicate type, also referred to as poly(sialate) (M)-PS. It is formed by a reaction of at least one source of aluminium and silica, containing units of $AlO_4^-$ and $SiO_4$, strongly alkaline and at ambient temperature.

The geopolymers in the present invention may be represented by the formula (I):

$$M_n[-(Si-O_2)_z-(Al-O_2)-]_n \qquad (1)$$

in which:

M is a monovalent cation, z defines the ratio Si:Al and n is the degree of polymerisation.

Aluminosilicate geopolymers (hereinafter simply referred to as "geopolymers") of the present invention, because of their constitution and their three-dimensional structure, in particular allow the fabrication of ceramic items. In relation to the present invention and in an equivalent way, the term "geopolymeric resin" is also used. The hardening of the geopolymer after the addition of an aqueous solvent (for example, by the addition of water) is carried out by polycondensation reaction.

Dry particulate compositions include at least one mineral comprising or containing an aluminosilicate. The term "mineral containing an aluminosilicate" means a mineral composition whose chemical composition includes principally the species $SiO_2$ and $Al_2O_3$, but nevertheless likely to contain small amounts of other chemical species, in some cases referred to as impurities. Depending on their origin, the content in Al, Si and O of the mineral containing an aluminosilicate may vary, as well as the content of inert constituents or impurities (for example, quartz, cristobalite, mullite, muscovite, mica, anatase, rutile, kaolinite, albite, orthoclase). The said mineral containing an aluminosilicate is preferably found in the form of particles.

The purpose of the present invention is also a process for the preparation of a geopolymer involving the addition of a defined quantity of water to a dry particulate composition according to the invention.

According to a method of realisation of the invention, the quantity of water added to the dry particulate compositions is less than or equal to 50% by weight, for example in the range between 10% and 50% by weight, compared with the total weight of the geopolymer, namely the sum of the weights of the dry particulate compositions and the water added.

According to a method of realisation of the invention, the process also includes the addition of a supplementary constituent after the addition of water and before geopolymerisation/solidification of the mixture. This supplementary constituent may in particular be chosen from the group consisting of mica, fireclay, quartz, quartz sand, silica fume, talc, andalusite, wollastonite, recycled glass, fibres, carbon nanotubes, metallic elements and their mixtures. Such a supplementary constituent is chosen so as to improve the final properties of the material.

According to another method of realisation of the invention, the process for preparation of a geopolymer includes:

a stage consisting in adding a defined quantity of water to the dry particulate composition, so as to form a reactive mixture, a stage of consolidation of the reactive mixture, in order to obtain a geopolymer.

The purpose of the present invention is also the use of the composition according to the invention or of the process according to the invention, to prepare products or items, for example, chosen from mortars, concretes, cements, coatings, items allowing waste management (for example, immobilisation of toxic or nuclear waste), geopolymer compositions reinforced with fibres, carbon nanotubes or metallic element, geopolymer foams (for example, for insulation), coatings (for example, fire-repellent), foundry equipment, bricks, resins, binders, roads or pavements.

Lastly, the present invention concerns the use of an aluminosilicate-polymeric additive mixture to prepare a dry particulate composition in order to form a geopolymer.

According to a method of realisation of the invention, the said mixture is such that:

the amorphous phase content of the said mixture is at least 30% by weight, and the result of multiplying the specific surface area in $m^2/g$ by the amorphous phase content of the said mixture falls in the range 1 to 18.

DETAILED DESCRIPTION OF THE INVENTION

Dry Particulate Compositions

The present invention concerns dry particulate compositions for the preparation of geopolymer materials. These compositions are also referred to as dry pre-mixtures for geopolymers and are used to form a geopolymer by the addition of water. The dry particulate compositions according to the present invention present a major advantage over the previous state of knowledge in that they are not based on the use of strong and corrosive basic alkaline solutions (with these being commonly used to prepare geopolymers under the previous state of knowledge). Additionally, the time taken to obtain a geopolymer (solidified structure) from dry compositions according to the invention is considerably reduced because of the fact that a single stage involving the addition of water is necessary and that the reaction produced does not require a stage of decomposition of the oligopolymers present in the alkali metal silicate solution.

In some embodiments, the dry particulate compositions according to the invention can include at least three constituents, but can also include supplementary constituents, in particular those listed below. Surprisingly, the inventor found that the addition of a polymeric additive allowed geopolymers to be obtained presenting satisfactory mechanical properties.

According to the present invention, a geopolymer may be obtained in this way by combining a dry pre-mixture for geopolymer with a defined quantity of water. A reactive mixture is then obtained. This reactive mixture, after a fixed period of time, solidifies and then a geopolymer is in fact obtained.

The present invention is based on differences in the speeds at which the various constituents of the dry particulate compositions according to the invention are dissolved in water. The alkaline sources (alkali metal hydroxide and alkali metal silicate) dissolve in water then procure a reactive mixture for dissolving the aluminosilicate.

According to the present invention, the dry particulate compositions for the preparation of the geopolymer are suitable for a process of dissolving-geopolymerisation comprising the following stages: (i) rapid dissolving of the alkaline source to obtain a very basic reactive mixture (pH>12), and (ii) slower speed of reaction of the aluminosilicate, which allows the aluminosilicate to be dissolved only after the alkaline sources have been dissolved. The successive dissolving of the various constituents of the dry particulate compositions according to the invention and the presence in the mixture of a polymeric additive (for example, an olefinic thermoplastic polymer) lead to obtaining a reactive mixture suitable for a geopolymerisation reaction produced at a temperature of between 0° C. and 100° C.

The reactivity of the aluminosilicate depends on different factors, in particular the amorphous phase content of the aluminosilicate. The amorphous phase content depends on the quantity of the species that may be dissolved in a basic medium and that may then participate in the geopolymerisation reaction.

The reactivity of the aluminosilicate may also depend on the specific surface area of the aluminosilicate. A greater specific surface area of the aluminosilicate leads to a greater speed of reaction.

The amorphous phase content of the aluminosilicate-polymeric additive mixture is determined by X-ray diffraction (a method perfected by Rietveld).

The patent application filed in France on 29 Feb. 2016 under number FR 16 0033 (Imerys Ceramics), not yet published, describes dry particulate compositions for geopolymers. In this document, the dry particulate compositions are chosen so that the aluminosilicate has a minimal rate in the amorphous phase of 45% and that the product of multiplying the specific surface area by the amorphous phase content varies between 1 and 15.

Regarding the present invention, as shown in the following examples, the inventor demonstrates that the presence of a polymeric additive allows dry particulate compositions to be prepared from a greater variety of minerals containing an aluminosilicate. These minerals may in particular present greater reactivity.

According to a method of realising the present invention, the amorphous phase content of the aluminosilicate-polymeric additive mixture is at least 30% by weight compared with the total weight of the aluminosilicate in the composition. The amorphous phase content of the aluminosilicate-polymeric additive mixture may represent, for example, at least 40% by weight, at least 50% by weight, at least 55% by weight, at least 60% by weight or at least 70% by weight or at least 80% by weight, or even at least 90% by weight of the total weight of the said mixture in the composition.

According to a method of realising the present invention, the aluminosilicate-polymeric additive mixture is such that the result of multiplying the specific surface area (in $m^2/g$) of the said mixture by the amorphous phase content of that mixture is between 1 and 18.

According to a method of realising the present invention, the result of multiplying the specific surface area (in $m^2/g$) by the amorphous phase content falls within the range 1 to 18 such as, for example, 5 to 15, or 7 to 15, or 8 to 15, or 10 to 15.

The aluminosilicates to be used in the present invention can be obtained by grinding the raw materials. In the case of kaolin, the particulate material can then be burned by using, for example, a furnace or a calcination furnace. The aluminosilicate source may also be a by-product of calcination, and in particular fly ash. The particulate matter is then separated according to size by using a sieve or a metallic mesh or an air classifier in order, for example, to break down or separate by filtration any aggregate above a certain diameter that has formed. The particles of aluminosilicate may still be in the form of aggregates or particles, although the aggregates or particles may have a greater maximum diameter cut ($d_{100}$).

According to a method of realising the present invention, the aggregates/particles of aluminosilicate present a size $d_{100}$ of less than 300 μm or of less than 200 μm or of less than 150 μm, such as, for example, less than 120 μm or less than 100 μm or less than 90 μm or less than 80 μm or less than 50 μm or less than 35 μm. In another aspect, the the aggregates/particles of aluminosilicate present a size $d_{100}$ ranging from 0.5 μm to 300 μm, such as for example from 1 μm to 200 μm, 10 μm to 200 μm from 25 μm to 300 μm, or from 25 μm to 200 μm. As used in the present invention, a particle size of less than 300 μm implies that after calcination, the aggregates of aluminosilicate are filtered, for example, by means of a sieve, a metallic mesh or air classifier. This also applies to all the other values for the particle dimensions.

According to the present invention, a geopolymer material may be formed by the addition of water using a dry particulate composition. The quantity of water introduced into the dry particulate composition must be such that the water content of the mixture obtained from the particulate material and water is less than 50% by weight, varying for example between 10% by weight and 50% by weight. The quantity of water may, for example, increase from 15% by weight to 40% by weight or the quantity of water may, for example, go from 20% by weight to 35% by weight, so as to be, for example, 25% by weight or about 28% by weight or about 30% by weight or about 32% by weight. These quantities of water provide the ideal conditions for dissolving all species and for the geopolymerisation reaction to be completed. If there is not enough water, all the species (Si and Al) are not dissolved, because the medium of the reaction becomes saturated and the geopolymerisation reaction remains incomplete. If there is too much water, the pH of the reactive mixture falls and all the species are not dissolved. In addition, too small a concentration of the species Si and Al limits the formation of a bond between the atoms and thereby prevents the formation of a geopolymer network. Here again, the geopolymerisation reaction is incomplete.

According to the present invention, the aluminosilicate may be chosen from the group consisting of metakaolin, fly ash, halloysite, metahalloysite, slag, pulverised rock, fine sand, fireclay and their mixtures. It is particularly advantageous for the present invention to use an aluminosilicate requiring little water. In a method of reaslising the present invention, the aluminosilicate is a metakaolin.

According to the present invention, the alkali metal hydroxide may be chosen from the group consisting of NaOH, KOH, LiOH, RbOH, or CsOH or any of their mixtures. The alkali metal hydroxides preferred are NaOH, KOH and LiOH.

According to the present invention, the alkali metal silicate to be used in the dry particulate compositions may be chosen from the group consisting of Na, K, Li, Rb, Cs and their mixtures. In particular, the alkali metal silicate may be of sodium silicate, sodium metasilicate (waterglass) and/or potassium silicate.

According to a method of realising the present invention, the dry particulate compositions to form geopolymer include the following:

(i) Metakaolin as an aluminosilicate, (ii) An olefinic thermoplastic polymer as a polymeric additive, (iii) Sodium silicate as a alkali metal silicate, and (iv) NaOH as an alkali metal hydroxide.

According to another method of realising the present invention, according to a method of realising the present invention, the dry particulate compositions to form a geopolymer include the following:

(i) Metakaolin as an aluminosilicate, (ii) A polyethylene (PE), polypropylene (PP), thermoplastic urethane (TPU), styrene-butadiene styrene (SBS), styrene ethylene butadiene styrene (SEBS), polyesters, polyethylene terephthalate (PET), high-density polyethylene (HDPE), low-density polyethylene (LDPE), polyvinyl chloride (PVC), polyvinylidene chloride (PVDC), polystyrene, polyamide, acrylonitrile butadiene styrene (ABS), maleimide/bismaleimide, melamine formaldehyde, phenol formaldehyde, polyepoxide, polyetheretherketone (PEEK), polyetherimide, polyimide, polylactic acid (PLA), polymethyl methacrylate (PMMA), polytetrafluoroethylene (PTFE), urea-formaldehyde, furan, silicone, polysulfone, or mixtures thereof, Sodium silicate as an alkali metal silicate, and (iii) NaOH as an alkali metal hydroxide.

According to the present invention, the dry particulate compositions may also include a supplementary constituent chosen from the group consisting of mica, fireclay, quartz, quartz sand, silica fume, talc, andalusite, wollastonite, recycled glass, fibres, carbon nanotubes, metallic elements and their mixtures.

According to a method of realising the present invention, the dry particulate compositions include:

30% to 74% by weight of aluminosilicate,

10% to 30% by weight of a polymeric additive,

15% to 50% by weight of an alkali metal silicate, and

1% to 25% by weight of an alkali metal hydroxide, with the percentages being expressed in proportion to the total weight of the dry particulate compositions.

According to another method of realising the present invention, the dry particulate compositions include:

30% to 74% by weight of aluminosilicate, or 40% to 72% by weight of aluminosilicate, such as for example 50% to 70% by weight of aluminosilicate, 55% to 65% by weight of aluminosilicate, 30% to 60% by weight of aluminosilicate, 30% to 50% by weight aluminosilicate, about 58% by weight of aluminosilicate or about 60% by weight of aluminosilicate or about 62% by weight of aluminosilicate, 10% to 30% by weight of a polymeric additive, or 12% to 27% by weight of a polymeric additive, or 15% to 25% by weight of a polymeric additive, or 16% to 20% by weight of a polymeric additive, or 20% to 30% by weight of a polymeric additive, 15% to 50% by weight of alkali metal silicate, or 20% to 40% by weight of alkali metal silicate such as, or 15% to 35% by weight of alkali metal silicate such as, or 35% to 50% by weight of alkali metal silicate such as, for example, 25% to 35% by weight of alkali metal silicate, or about 28% by weight of alkali metal silicate or about 30% by weight of alkali metal silicate or about 32% by weight of alkali metal silicate, 2% to 15% by weight of alkali metal hydroxide, or 2% to 5% by weight of alkali metal hydroxide, or 5% to 10% by weight of alkali metal hydroxide, or 5% to 15% by weight of alkali metal hydroxide, or 10% to 15% by weight of alkali metal hydroxide, such as, for example, about 6% by weight of alkali metal hydroxide or about 7% by weight of alkali metal hydroxide or about 8% by weight of alkali metal hydroxide, or about 9% by weight of alkali metal hydroxide, with the percentages being expressed in proportion to the total weight of the dry particulate compositions.

Process for the Preparation of Geopolymers and the Geopolymers Obtained

The present invention also concerns a process for the preparation of a geopolymer from one of the dry particulate compositions described above. According to a method of realisation of the invention, the quantity of water added to the dry particulate composition is less than or equal to 50% by weight, for example in the range between 10% and 50% by weight, or between 15% by weight to 50% by weight, compared with the total weight of the geopolymer, namely the sum of the weights of the dry particulate composition and the water added.

After the addition of water, the alkali metal hydroxide and the alkali metal silicate pass rapidly into solution, which generates an exothermic reaction. It is possible to include a supplementary stage of homogenisation of the mixture.

According to a method of realising the invention, the process also includes the addition of a supplementary constituent after the addition of water and before the geopolymerisation/solidifying of the mix. This supplementary constituent may in particular be chosen from the group consisting of mica, fireclay, quartz, quartz sand, silica fume, talc, andalusite, wollastonite, recycled glass, fibres, carbon nanotubes (CNT), metallic elements and their mixtures. This supplementary constituent is chosen in such a way as to improve the final properties of the material.

According to another method of realising the invention, the process for the preparation of a geopolymer includes:

a stage consisting in adding a defined quantity of water to the dry particulate compositions so as to form a reactive mixture, a stage of solidifying of the reactive mixture in such a way as to obtain a geopolymer.

It is possible to add aggregates or other material to the homogenised mixture before the geopolymerisation, if necessary.

The present invention also concerns a geopolymer likely to be obtained by the process of the present invention and/or by using a dry particulate composition according to the present invention.

The present invention also includes a geopolymer comprising 50% by weight or more of the dry particulate compositions according to the present invention and up to 50% by weight of water. For example, the geopolymer may consist of 60% by weight or more of the dry particulate compositions according to the present invention and up to 40% by weight of water or the geopolymer may consist of 70% by weight or more of the dry particulate compositions according to the present invention and up to 30% by weight of water, or the geopolymer may consist of 80% by weight or more of the dry particulate compositions according to the present invention and up to 20% by weight of water, or the geopolymer may consist of 90% by weight or more of the dry particulate compositions according to the present invention and up to 10% by weight of water.

Regarding the present invention, it is possible to add, after the addition of water, a supplementary constituent chosen from the group consisting of mica, fireclay, quartz, quartz sand, silica fume, talc, andalusite, wollastonite, recycled glass, fibres, carbon nanotubes, metallic elements and their mixtures. This supplementary element is generally aimed at modifying the final properties of the geopolymer.

Applications of Geopolymers

The purpose of the present invention is also the use of the composition according to the invention or of the process according to the invention, to prepare products or items, for example chosen from mortars, concretes, cements, coatings, items allowing waste management (for example, immobilisation of toxic or nuclear waste), geopolymer compositions reinforced with fibres, carbon nanotubes or metallic elements, geopolymer foams (for example, for insulation), coatings (for example, anti-fire), foundry equipment, bricks, resins, binders, roads or pavements. These products and items also form part of the present invention.

It will be noted that the present invention may include any combination of characteristics and/or limitations referred to in the present document, except where the combinations of characteristics are mutually exclusive. The above description gives particular methods of realising the present invention for illustrative purposes. But it is clear to professionals that numerous modifications and variations may be made to the methods of realisation described in the present document. It is understood that all these modifications and variations are found in the scope of the present invention.

Use of an Aluminosilicate-Polymeric Additive Mixture

The present invention concerns the use of a mineral mixture containing an aluminosilicate-polymeric additive to prepare a dry particulate composition in order to form a geopolymer.

According to a method of realising this use, the said mixture is such that:
the amorphous phase content of the said mixture is at least 30% by weight, and
the result of multiplying the specific surface area in $m^2/g$ by the amorphous phase content of the said mixture falls in the range 1 to 18.

EXAMPLES

Example 1

Preparation of the Dry Particulate Compositions

According to this example, different dry particulate compositions are prepared for geopolymer, using the ingredients listed in Table 1 below.

TABLE 1

| Raw materials used | | |
|---|---|---|
| Aluminosilicate #1 | Metakaolin d50: 2 μm to 3 μm Pozzolanic index (Chappelle test) 1100 mg Ca(OH)2/g | IMERYS |
| Aluminosilicate #2 | Metakaolin d50: 1 μm to 2 μm Pozzolanic index (Chappelle test) 1400 mg Ca(OH)2/g | IMERYS |
| Aluminosilicate #3 | Metakaolin d50: 10 μm to 15 μm Pozzolanic index (Chappelle test) 1100 mg Ca(OH)2/g | IMERYS |
| Alkali metal hydroxide | Sodium hydroxide in the form of fine tablets | Sigma Aldrich |

10

TABLE 1-continued

| Raw materials used | | |
|---|---|---|
| Alkali metal silicate | Sodium silicate Britesil C205 in powder form | PQ Corporation |
| Olefinic thermoplastic polymer | Polyethylene Dowlex 2631 in the form of granules | DOW |
| Methyl-cellulose | Binding methyl-cellulose in powder form | Sennelier |

The dry particulate compositions for geopolymer are prepared using a mixture of the different constituents in the proportions indicated in Table 2 below.

TABLE 2

| | Metakaolin | Additive | Na₂O₃Si | NaOH |
|---|---|---|---|---|
| Comparative example 1 | #1—60.27% | n/a | 27.98% | 11.75% |
| Comparative example 2 | #2—64.68% | n/a | 27.63% | 7.69% |
| Comparative example 3 | #3—53.21% | Methyl-cellulose 9.39% | 26.09% | 11.31% |
| Example 1 | #1—45.08% | PE 7.96% | 37.53% | 943% |
| Example 2 | #1—42.35% | PE 10.59% | 37.74% | 9.33% |
| Example 3 | #2—48.11% | PE 12.03% | 27.06% | 12.81% |
| Example 4 | #3—53.36% | PE 9.42% | 25.63% | 11.59% |
| Example 5 | #3—50.24% | PE 12.56% | 25.49% | 11.71% |

Preparation of Geopolymers by the Addition of Water

Water is then added to the dry particulate compositions previously prepared and the mixture is homogenised using a mechanical mixer. The quantity of water added is indicated in Table 3 below compared with the total weight of the geopolymer. After homogenisation, the temperature of the reactive mixture increases to about 55° C., because of the exothermic dissolving of the sodium hydroxide and sodium silicate in the water.

The mixtures are then placed in moulds and the mixtures are left to harden for a period of 24 hours.

TABLE 3

| | Dry particulate compositions (%) | Water (%) |
|---|---|---|
| Comparative example 1 | 53.45 | 46.55 |
| Comparative example 2 | 50.33 | 49.67 |
| Comparative example 3 | 64.06 | 35.94 |
| Example 1 | 63.35 | 36.65 |
| Example 2 | 63.86 | 36.14 |
| Example 3 | 60.73 | 39.27 |
| Example 4 | 72.95 | 27.05 |
| Example 5 | 74.52 | 25.48 |

Analysis of the Geopolymers Obtained

For the compositions in examples 1 to 5, solidification of the mixtures is effective and the products obtained present mechanical properties and visible geometric density that are satisfactory. Conversely, the compositions of comparative examples 1 to 3 do not allow sufficient solidification and do not lead to the formation of a geopolymer.

Example 2—Characterisation of Metakaolin-Polyethylene Mixtures According to the Invention The quantity in the amorphous phase in the mixtures is determined by quantitative X-ray diffraction. The measure is carried out on non-oriented powder of size less than 40 μm with 30% of zincite as an internal gauge and by modelling the diffractogram using the Topas (Bruker) software.

The mixtures are also characterised by measuring their "BET specific surface area". The BET specific surface area refers to the method of measuring the specific surface areas of molecules that are physically absorbed, according to the theory by Brunauer, Emmett and Teller ("BET"). The BET surface area may be measured by means of a Gemini III 2375 specific surface area analyser (Micromeritics Instrument Corporation), using nitrogen as the absorbing gas.

The results are given in Table 4 below.

TABLE 4

| Property of the metakaolin-polyethylene mixtures of the different examples | | |
|---|---|---|
| Amorphous phase (% by weight) | Specific surface area (m²/g) | Result of ap × ssa |
| Example 1 | 64.6 | 13.6 | 8.8 |
| Example 2 | 60.8 | 12.8 | 7.8 |
| Example 3 | 69.6 | 14.9 | 10.4 |
| Example 4 | 83.0 | 10.9 | 9.1 |
| Example 5 | 78.1 | 10.4 | 8.1 |

Table 5 indicates the amorphous phase content and the result from ap×ssa [amorphous phase×specific surface area] of Comparative examples 1 and 2:

TABLE 5

| | Amorphous phase (% by weight) | Specific surface area (m²/g) | Result of ap × ssa |
|---|---|---|---|
| Comparative example 1 | 98.0 | 16.6 | 16.3 |
| Comparative example 2 | 74.9 | 22.0 | 16.5 |

The above description is presented to enable a person skilled in the art to make and use the invention, and is provided in the context of a particular application and its requirements. Various modifications to the embodiments disclosed herein will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. In this regard, certain embodiments within the disclosure may not show every benefit of the invention, considered broadly.

The invention claimed is:

1. A dry particulate composition for forming a geopolymer, the dry particulate composition comprising:
an aluminosilicate-polymeric additive mixture comprising
an aluminosilicate-containing mineral
an olefinic thermoplastic polymer as a polymeric additive,
an alkali metal silicate, and
an alkali metal hydroxide;
wherein
an amorphous phase content of the aluminosilicate-polymeric additive mixture is at least 30% by weight, and
the result of a BET specific surface area in m²/g of the aluminosilicate-polymeric additive mixture multiplied by the amorphous phase content of the aluminosilicate-polymeric additive mixture falls in the range 1 to 10.4.

2. The dry particulate composition according to claim 1, comprising:
25% to 79% by weight of aluminosilicate-containing mineral,
5% to 30% by weight of polymeric additive,
15% to 50% by weight of alkali metal silicate, and
1% to 25% by weight of alkali metal hydroxide,
with the percentages being expressed in proportion to the total weight of the dry particulate composition.

3. The dry particulate composition according to claim 1, wherein the amorphous phase content of the aluminosilicate-polymeric additive mixture is at least 45% by weight.

4. The dry particulate composition according to claim 1, in which the aluminosilicate is chosen from the group consisting of metakaolin, fly ash, halloysite, meta-halloysite, slag, pulverised rock, fine sand, activated clay, kaolin, mica, fine feldspar, and mixtures thereof.

5. The dry particulate composition according to claim 1, in which the alkali metal of the alkali metal silicate is chosen from the group consisting of Na, K, Li, Rb, Cs, and mixtures thereof.

6. The dry particulate composition according to claim 1, in which the alkali metal hydroxide is chosen from the group consisting of NaOH, KOH, LiOH, RbOH, CsOH, and mixtures thereof.

7. A process for the preparation of a geopolymer comprising or consisting of the addition of a defined quantity of water to a dry particulate composition according to claim 1.

8. The process for the preparation of a geopolymer of claim 7, wherein the quantity of water added to the dry particulate compositions is less than or equal to 50% by weight.

9. The process for the preparation of a geopolymer of claim 7, wherein the quantity of water added to the dry particulate compositions ranges from 10% to 50% by weight.

10. A geopolymer comprising a dry particulate composition according to claim 1.

11. The dry particulate composition according to claim 1, wherein
the polymeric additive is a polyolefin;
the alkali metal of the alkali metal silicate is chosen from the group consisting of Na, K, Li, Rb, Cs, and mixtures thereof; and
the alkali metal hydroxide is chosen from the group consisting of NaOH, KOH, LiOH, RbOH, CsOH, and mixtures thereof.

12. The dry particulate composition according to claim 11, wherein the aluminosilicate is chosen from the group consisting of metakaolin, fly ash, halloysite, meta-halloysite, slag, pulverised rock, fine sand, activated clay, kaolin, mica, fine feldspar, and mixtures thereof.

13. The dry particulate composition according to claim 12, wherein the amorphous phase content of the aluminosilicate-polymeric additive mixture is at least 45% by weight.

14. The dry particulate composition according to claim 12, comprising:
25% to 79% by weight of aluminosilicate,
5% to 30% by weight of the polymeric additive,
15% to 50% by weight of the alkali metal silicate, and
1% to 25% by weight of the alkali metal hydroxide,
with the percentages being expressed in proportion to the total weight of the dry particulate composition.

15. The dry particulate composition according to claim 14, wherein the amorphous phase content of the aluminosilicate-polymeric additive mixture is at least 45% by weight.

16. The dry particulate composition according to claim 1, wherein the amorphous phase content is determined by X-ray diffraction.

17. The dry particulate composition according to claim 1, wherein the olefinic thermoplastic polymer is chosen from the group consisting of polyethylene (PE), polypropylene (PP), styrene-butadiene styrenes (SBS), styrene ethylene butadiene styrenes (SEBS), high density polyethylenes (HDPE), low-density polyethylenes (LDPE), polystyrenes, acrylonitrile butadiene styrenes (ABS), and mixtures thereof.

18. The dry particulate composition according to claim 1, wherein the olefinic thermoplastic polymer is chosen from the group consisting of polyethylene (PE), styrene-butadiene styrenes (SBS), styrene ethylene butadiene styrenes (SEBS), high density polyethylenes (HDPE), low-density polyethylenes (LDPE), polystyrenes, acrylonitrile butadiene styrenes (ABS), and mixtures thereof.

19. The dry particulate composition according to claim 1, wherein the olefinic thermoplastic polymer is polyethylene (PE).

20. The dry particulate composition according to claim 2, comprising 5% to 15% by weight of polymeric additive by weight of the dry particulate composition.

* * * * *